United States Patent
Li et al.

(10) Patent No.: US 10,599,821 B2
(45) Date of Patent: Mar. 24, 2020

(54) COLLECTING USER FEEDBACK THROUGH LOGON QUESTIONS

(71) Applicant: International Business Machines Corporation, Armonk, NY (US)

(72) Inventors: He Li, Beijing (CN); Xin Tang, Ningbo (CN); Yi Yao, Beijing (CN); Kun Yan Yin, Ningbo (CN); Guang Qing Zhong, Beijing (CN)

(73) Assignee: International Business Machines Corporation, Armonk, NY (US)

(*) Notice: Subject to any disclaimer, the term of this patent is extended or adjusted under 35 U.S.C. 154(b) by 192 days.

(21) Appl. No.: 15/836,161

(22) Filed: Dec. 8, 2017

(65) Prior Publication Data
US 2019/0180009 A1    Jun. 13, 2019

(51) Int. Cl.
*G06N 5/02*     (2006.01)
*G06F 21/31*    (2013.01)

(52) U.S. Cl.
CPC ............ *G06F 21/31* (2013.01); *G06N 5/022* (2013.01); *G06F 2221/2103* (2013.01)

(58) Field of Classification Search
None
See application file for complete search history.

(56) References Cited

U.S. PATENT DOCUMENTS

| | | |
|---|---|---|
| 6,195,698 B1 | 2/2001 | Lillibridge et al. |
| 2005/0114705 A1 | 5/2005 | Reshef et al. |
| 2008/0133347 A1 | 6/2008 | Josifovski et al. |
| 2015/0365401 A1* | 12/2015 | Brown ............... H04L 63/0838 726/7 |
| 2016/0328545 A1 | 11/2016 | Chan et al. |
| 2019/0115104 A1* | 4/2019 | Uske .................. G06F 11/3438 |

FOREIGN PATENT DOCUMENTS

CN      104867034 A    8/2015

OTHER PUBLICATIONS

"A new approach to online market research" retrieved from https://www.google.com/analytics/resources/product-overview-a-new-approach-to-online-market-research.html; at least as early as 2016.
Screenshots of questions from Daily Record website retrieved from www.dailyrecord.co.uk/scotland-now/scottish-meat-saved-stonehenge-works-11373470; at least as early as Nov. 2017.

\* cited by examiner

*Primary Examiner* — Joseph P Hirl
*Assistant Examiner* — Hassan Saadoun
(74) *Attorney, Agent, or Firm* — Brown & Michaels, PC; Christopher Pignato (57) ABSTRACT

Feedback is collected from a user during log-on to a system. The feedback from the user can be used to enhance a knowledge base. The feedback is required from the user in order for the user to gain access to the system.

17 Claims, 5 Drawing Sheets

COLLECTING USER FEEDBACK THROUGH LOGON QUESTIONS

BACKGROUND

The present invention relates to feedback collection and knowledge base enhancement, and more specifically to enhancing the knowledge base of the cognitive QA system by learning the user feedback in designed question in verification code.

For on-line QA and recommendation systems, feedback received from users includes a large number of valuable insights such as business ideas, user experience and suggestions. However, less than half of users provide written feedback regarding their experience. Furthermore, developers struggle with how to collect most effective and useful feedbacks for systems, how to collect user feedback without requiring the user to expend additional effort and how to design the proper questions for the target log-on user based his/her interest and capability.

SUMMARY

According to one embodiment of the present invention, a method of verification for controlling access of a user to a system is disclosed. The method comprising the steps of: a computer receiving login information the user; the computer selecting a question from a knowledge base; the computer creating a plurality of answers to the question selected from the knowledge base; the computer presenting the question and the plurality of answers to the user; the computer accepting a selection of an answer from the user and storing the answer in the knowledge base for future use in selecting answers for other users; the computer analyzing the answer provided by the user; and the computer controlling access to the system based on the analysis of the answer from the user to the question and the user's answer will be used to enhance the original system knowledge base.

According to another embodiment of the present invention, a computer program product for verification for controlling access of a user to a system is disclosed. The computer program product using a computer comprising at least one processor, one or more memories, one or more computer readable storage media, the computer program product comprising a computer readable storage medium having program instructions embodied therewith. The program instructions executable by the computer to perform a method comprising: receiving, by the computer, login information the user; selecting, by the computer, a question from a knowledge base; creating, by the computer, a plurality of answers to the question selected from the knowledge base; presenting, by the computer, the question and the plurality of answers to the user; accepting, by the computer, a selection of an answer from the user and storing the answer in the knowledge base for future use in selecting answers for other users; analyzing, by the computer, the answer provided by the user; and controlling, by the computer, access to the system based on the analysis of the answer from the user to the question.

According to another embodiment of the present invention, a computer system for verification for controlling access of a user to a system is disclosed. The computer system comprising a computer comprising at least one processor, one or more memories, one or more computer readable storage media having program instructions executable by the computer to perform the program instructions. The program instructions comprising: receiving, by the computer, login information the user; selecting, by the computer, a question from a knowledge base; creating, by the computer, a plurality of answers to the question selected from the knowledge base; presenting, by the computer, the question and the plurality of answers to the user; accepting, by the computer, a selection of an answer from the user and storing the answer in the knowledge base for future use in selecting answers for other users; analyzing, by the computer, the answer provided by the user; and controlling, by the computer, access to the system based on the analysis of the answer from the user to the question.

DETAILED DESCRIPTION

In an embodiment of the present invention feedback is collected from a user during log-on to a system. The feedback from the user can be used to enhance a knowledge base. The feedback is required from the user in order for the user to gain access to the system.

For example, a knowledge base which maintains a lot of question & answer pairs works for a QA system. Some questions get definitely correct answers, some questions get definitely incorrect answers, and some questions get several answer candidates, part of the candidates may be correct, part of them may be not. In an embodiment of the present invention, the system aims to achieve correct answers for all of the questions in this knowledge base.

System Environment

Figure 1:
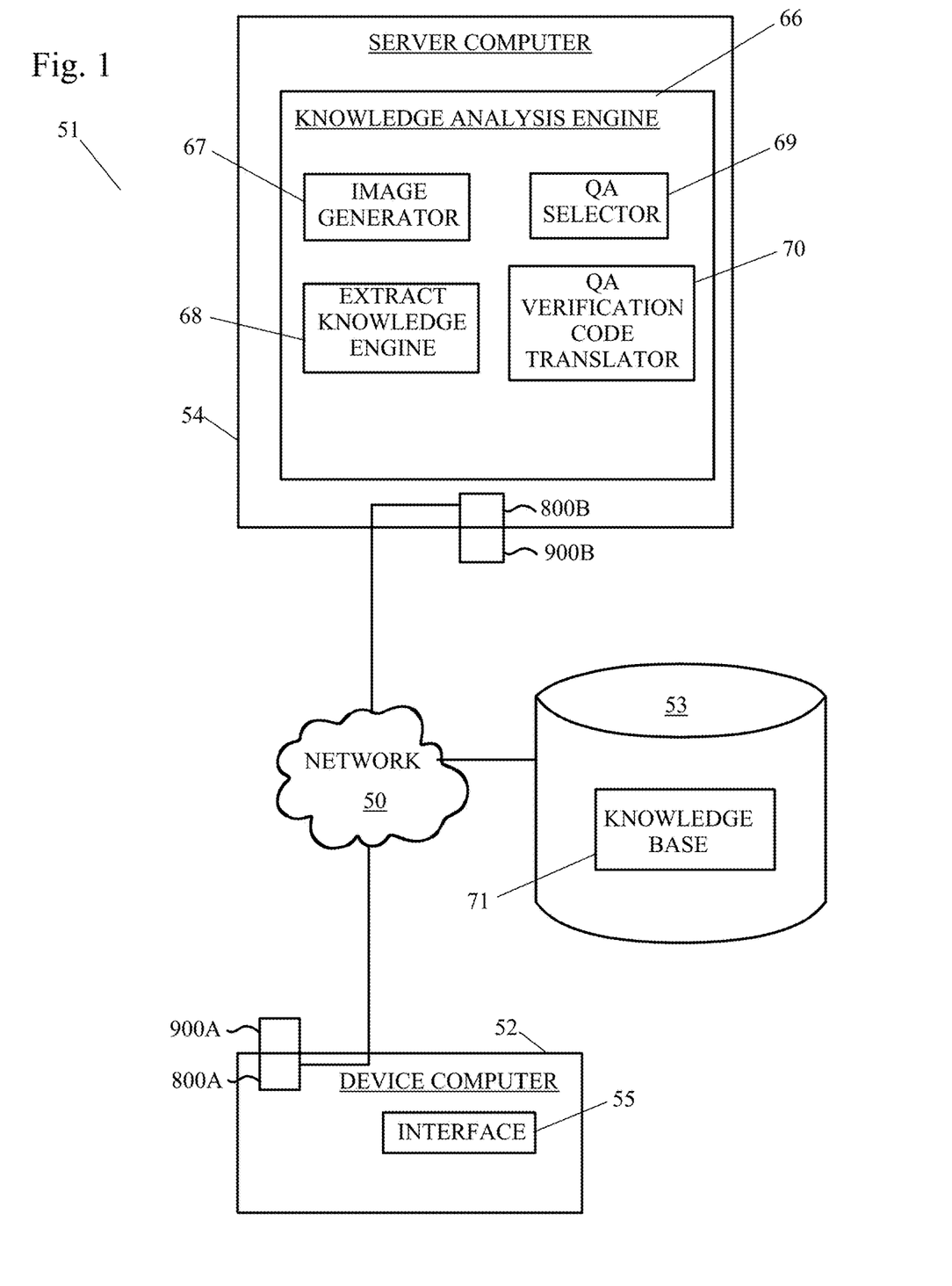
FIG. 1 depicts an exemplary diagram of a possible data processing environment in which illustrative embodiments may be implemented.

FIG. 1 shows a block diagram of a system to which access will be controlled in accordance with the method.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, a repository 53, and a server computer 54 connect to network 50. In other exemplary embodiments, network data processing system 51 may include additional client or device computers, storage devices or repositories, server computers, and other devices not shown.

The repository 53 can contain a knowledge base which includes questions and multiple answers with questions including an association with a "definitely correct" answer or an "unsure" answer. The repository may additional include user information which includes, but is not limited to system log-on information, educational background, level of management within an enterprise, and previous answers given to questions presented.

The device computer 52 may contain an interface 55, which may accept commands and data entry from a user. The commands may be regarding log-in or log-on information for a system and answers to questions. The interface can be, for example, a command line interface, a graphical user interface (GUI), a natural user interface (NUI) or a touch user interface (TUI). The device computer 52 includes a set of internal components 800*a* and a set of external components 900*a*, further illustrated in FIG. 5.

Figure 5:
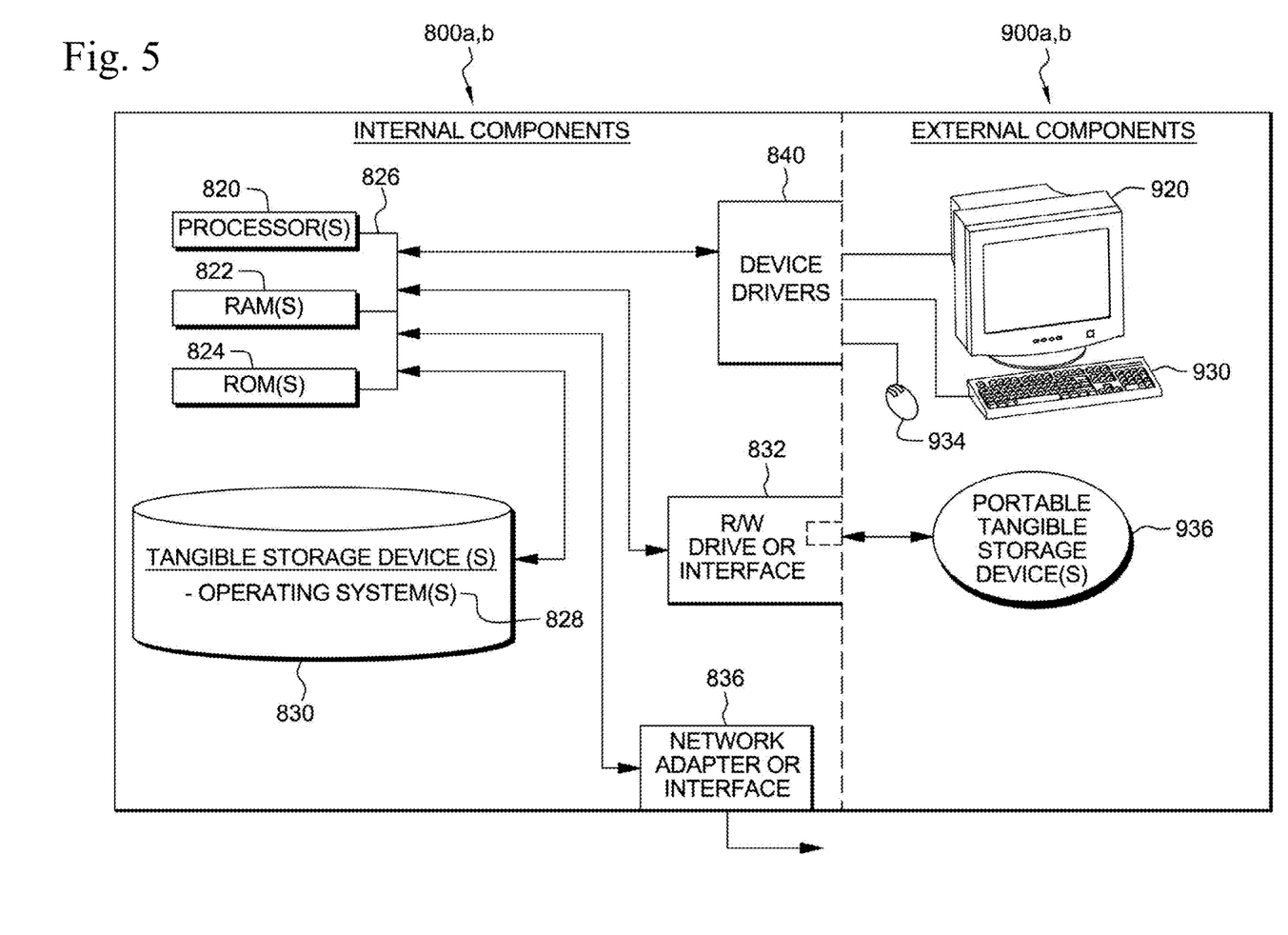
FIG. 5 illustrates internal and external components of a client computer and a server computer in which illustrative embodiments may be implemented.

Server computer 54 includes a set of internal components 800*b* and a set of external components 900*b* illustrated in FIG. 5. In the depicted example, server computer 54 provides information, such as boot files, operating system images, and applications to the device computer 52. Server computer 54 can compute the information locally or extract the information from other computers on network 50. The server computer 54 includes a knowledge analysis engine 66. The knowledge analysis engine 66 is a program which includes an image generator 67, an extract knowledge engine 68, a question and answer (QA) selector 69, and a question and answer (QA) verification code translator 70.

The QA selector 69 determines which question will be selected for presentation to the user during log-on process as well as the associated answers accompanying the question. The extracting knowledge engine 68 determines which answers are added to the knowledge base. The QA verification code translator 70 converts answers received from a captcha into input for the system.

Program code and programs such as knowledge analysis engine 66 may be stored on at least one of one or more computer-readable tangible storage devices 830 shown in FIG. 5, on at least one of one or more portable computer-readable tangible storage devices 936 as shown in FIG. 5, or on storage unit 53 connected to network 50, or may be downloaded to a device computer 52 or server computer 54, for use. For example, program code and programs such as knowledge analysis engine 66 may be stored on at least one of one or more storage devices 830 on server computer 54 and downloaded to device computer 52 over network 50 for use. Alternatively, server computer 54 can be a web server, and the program code, and programs such as knowledge analysis engine 66 may be stored on at least one of the one or more storage devices 830 on server computer 54 and accessed device computer 52. In other exemplary embodiments, the program code, and programs such as knowledge analysis engine 66 may be stored on at least one of one or more computer-readable storage devices 830 on device computer 52 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

FIG. 5 illustrates internal and external components of a device computer 52 and server computer 54 in which illustrative embodiments may be implemented. In FIG. 1, a device computer 52 and a server computer 54 include respective sets of internal components 800*a*, 800*b* and external components 900*a*, 900*b*. Each of the sets of internal components 800*a*, 800*b* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and knowledge analysis engine 66 are stored on one or more of the computer-readable tangible storage devices 830 for execution by one or more of the processors 820 via one or more of the RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800*a*, 800*b* also includes a R/W drive or interface 832 to read from and write to one or more portable computer-readable tangible storage devices 936 such as a CD-ROM, DVD, memory stick, magnetic tape, magnetic disk, optical disk or semiconductor storage device. Knowledge analysis engine 66 can be stored on one or more of the portable computer-readable tangible storage devices 936, read via R/W drive or interface 832 and loaded into hard drive 830.

Each set of internal components 800*a*, 800*b* also includes a network adapter or interface 836 such as a TCP/IP adapter card. Knowledge analysis engine 66 can be downloaded to the device computer 52 and/or the server computer 54 from an external computer via a network (for example, the Internet, a local area network or other, wide area network) and network adapter or interface 836. From the network adapter or interface 836, knowledge analysis engine 66 is loaded into hard drive 830. Knowledge analysis engine 66 can be downloaded to the server computer 54 from an external computer via a network (for example, the Internet, a local area network or other, wide area network) and network adapter or interface 836. From the network adapter or interface 836, knowledge analysis engine 66 is loaded into hard drive 830. The network may comprise copper wires, optical fibers, wireless transmission, routers, firewalls, switches, gateway computers and/or edge servers.

Each of the sets of external components 900*a*, 900*b* includes a computer display monitor 920, a keyboard 930, and a computer mouse 934. Each of the sets of internal components 800*a*, 800*b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Knowledge analysis engine 66 can be written in various programming languages including low-level, high-level, object-oriented or non object-oriented languages. Alternatively, the functions of a knowledge analysis engine 66 can be implemented in whole or in part by computer circuits and other hardware (not shown).

Method of Access Verification

Figure 2:
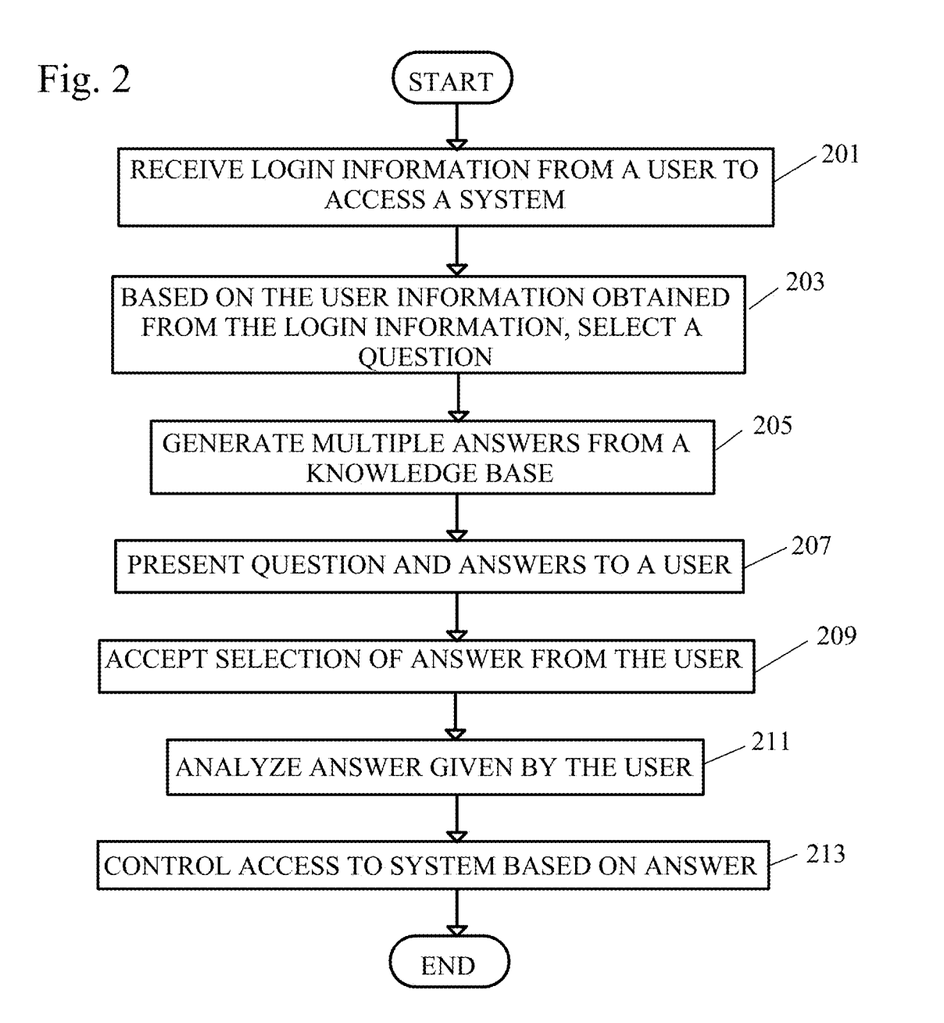
FIG. 2 shows a flowchart of a method of verification

As can be seen in FIG. 2, a method of verification for controlling access to a system has the following steps:

Step 201: Receive login information from a user. This login information would include at least identifying information for the user, and could also include other information such as a password, etc. This login information can be used to retrieve information about the user from a repository, for example repository 53, which can be used to evaluate the state of the user's knowledge later in the method, as detailed in FIG. 4.

Step 203: Based on the user information, select a question from a knowledge base. The questions will be evaluated based on various factors, such as popularity, user information, accuracy, latest time and other factors. Further detail of this step will be discussed below with reference to the flowchart of FIG. 3.

Step 205: Create a plurality of answers to the question selected in step 203.

In one embodiment, the answers should include at least one correct answer, and a plurality of answers which are incorrect or less correct.

In this example, the question prevents the user logging in and always choosing an answer randomly without thinking about which answer is correct relative to the question. When the user logging in finds out that they cannot login without choosing the correct answer, they will choose their answer carefully next time.

In an alternate embodiment, the answers selected for a question may not always include one correct answer.

For example, a question with several answer candidates in which neither the knowledge base 71 nor the knowledge analysis engine 66 knows which candidates are the correct answer for the question. In this case, it depends on the login user to choose correct answer from candidates, and then the chosen answer will be used to update the QA pairs stored in knowledge base. Since in this scenario, a user can login to the system successfully with choosing any answers, there's a chance that user will discover the rule and always chooses an answer randomly without thinking, in order to gain access to the system as soon as possible.

Each of the answers should be assigned a status of "definitely correct", or "definitely incorrect" or "not sure" (i.e. the system is unsure of the validity of the answer, and the method will be used over time to refine this into "definitely correct" or "definitely incorrect"). It should be noted that the answers are pre-created and stored as part of the knowledge base.

Initially, a search of the question in a benchmark search engine can be used to select at least some of the answers. These answers might be presumed to be correct, and the step might just provide the top few answers returned by the search engine.

Alternatively, some answers could be selected randomly from answers in the knowledge base to other questions, to provide answers which presumably are not correct. These answers may be stored in the knowledge base, associated with the question.

For example, if the QA pairs were as follows:
Question 1: Which sentence has the same meaning as "I want to go to dinner"?
Answer 1: "A. I'm hungry. B. I need food. C. I want to go to the store to buy a computer."

In the knowledge base, there's another QA pair such as:
Question 2: "Where do you want to have dinner?"
Answer 2: "I want to go to a restaurant for dinner."

Since Question 1 only has 3 answers, and there's a common word "dinner" in both Question 1 and Answer 2, Answer 2 could also be an answer candidate for Question 1, the search engine could be used to search for the keyword "dinner" to determine the relationship between Question 1 and Answer 2.

After the method has collected feedback on answers to the selected question from a number of users, the ranking of answers to be selected for a given question can be adjusted, as noted in the discussion of FIG. 4, below.

It should be noted that the knowledge base could be any kinds of knowledge base which is proprietary to any organization or any software system. The method of an embodiment of the present invention enhances the knowledge accuracy in the knowledge base.

Step 207: Present the question and the plurality of answers to the user. The answers can be presented as plain text, or, alternatively, could be presented as obscured text in graphics files such as used in the CAPTCHA challenge-response test (an acronym for "Completely Automated Public Turing test to tell Computers and Humans Apart").

Step 209: Accept a selection of an answer from the user and store the answer in the knowledge base for future use in selecting answers for other users. The answers could be presented as a multiple-choice "radio button" selection, or could require the user to manually type a letter or number, or a word or phrase, or other methods known to the art.

Step 211: Analyze the answer provided by the user and control access based on the analysis. The answer can be evaluated as correct, or incorrect, and may be compared with other answers given by other users. The user's position or level of management in the organization may be used in the analysis—for example, a manager might be considered to be more likely to give a correct answer requiring knowledge of the policies of the organization than a low-level clerk. The results of the analysis can be stored in the knowledge base.

Step 213: Access to the system is then controlled—granted or denied—based on the answer. If access is denied, the system might start again (step 201) or the user might be presented with another question (step 203). Further details of this step will be provided below in the discussion of the flowchart of FIG. 4.

Selecting a Question

Figure 3:
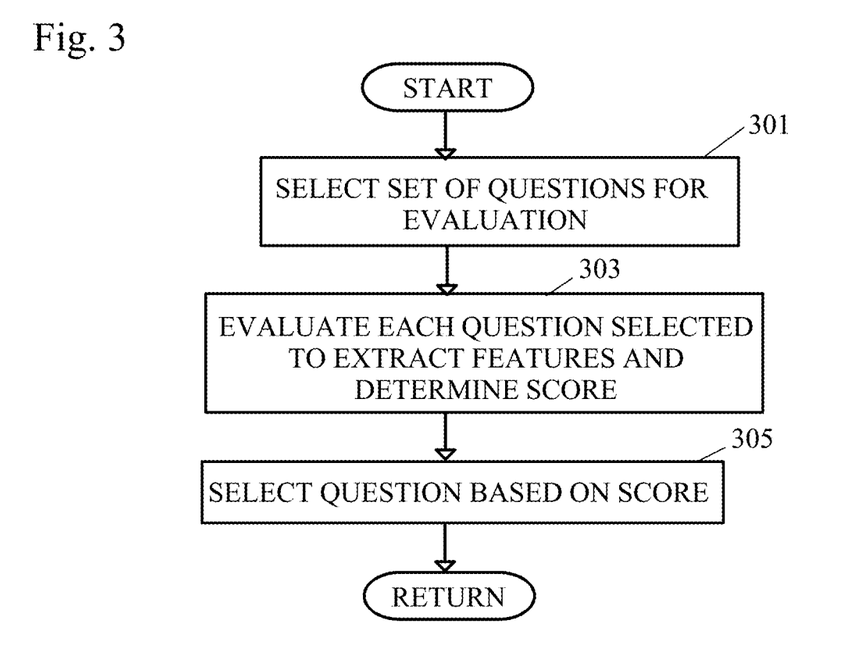
FIG. 3 shows a detailed flowchart of the step of selecting a question.

Referring to FIG. 3, the system selects a question for presentation to the user, for example through the QA selector 69 of the knowledge analysis engine 66. The questions are selected from a knowledge base of questions, which is constructed through the steps of FIG. 5 and is updated as part of the overall method.

This may be done by the steps of:

Step 301: Select a set of questions for evaluation from the knowledge base.

Questions are selected from the knowledge base. The knowledge base 71 may include uncertain knowledge, in which the uncertain knowledge is knowledge which has not been determined to be correct or incorrect. Besides questions based on uncertain knowledge, questions with certain knowledge or "definitely correct" correct answers may also be present within the knowledge base. These questions prevent a user from just selecting an answer freely just to gain access to the system as described above.

In one embodiment, the entire knowledge base is the set of questions selected for evaluation.

The number of questions to be selected for evaluation is adjustable and may be set by an administrator.

Step 303: The questions which were selected in step 301 will then be evaluated from the features of the questions in the knowledge base, as below, to determine a score for each question according to a formulas such as, for example:

$V_i=[v_t, v_f, v_a, v_u, v_b, v_c]$, where:

$$v_t^i = \frac{date_{cur} - date_i}{date_{cur} - MIN(date_0, \ldots date_i, \ldots date_n)}$$

$$v_a^i = MAX(Score_{A1}, Score_{A2}, Score_{An}) * \sigma_{score}$$

$$v_b^i = count(Times_i) / Count(Times_{total})$$

$$v_f^i = \frac{SCount_i}{MAX(SCount_1, \ldots SCount_n)}$$

$$v_u^i = [0, 1, 2, 3]$$

$$v_c^i = count_{(V_a < \theta)} W / W_{size}$$

Where:
i is the number of the question
$v_t$ is create time
$v_f$ is popularity
$v_a$ is accuracy as currently calculated
$v_u$ is current user domain knowledge, with the number 0, 1, 2, 3 being different domains
$v_b$ is recommended times that a specific question is shown to a user
$V_c$ is how many "not sure" knowledge has been recommended so far.

In terms of $v_a$, consider the following question has been supplied to a user:
Question: "What kind of food does the place supply for lunch?"
Answer: "A. Bread B. Pasta C. Rice D. Hamburger E. Toys" 20% people select A, 20% people select B, 20% people select C, 20% people select D, 20% people select E. In this case, the analysis engine cannot determine which is the best answer. The analysis engine can increase the value of $v_a$ to increase the possibility of showing this question to a user, so that the question could obtain the best answer as soon as possible.

In terms of $v_c$, if a question has been shown four times question with "not sure" answers to user, then a question with certain answers was shown to the user one time, and then the user was shown a question with "not sure" answers five times, then "uncertain knowledge questions have been recommended nine times so far.

The values of the v can be integer or float or any other values depending on the formula.

The value of V is a float value between 0 and 1 and is determined based on support vector regression (SVR). The weight of each of the factors (v) are adjusted based on current factors data and calculation of V.

Step 305: Select a question based on this score.

After the scores for each of the questions are calculated, the scores are sorted from highest to lowest and the question with the highest score is shown to the user at login.

Evaluating an Answer

Figure 4:
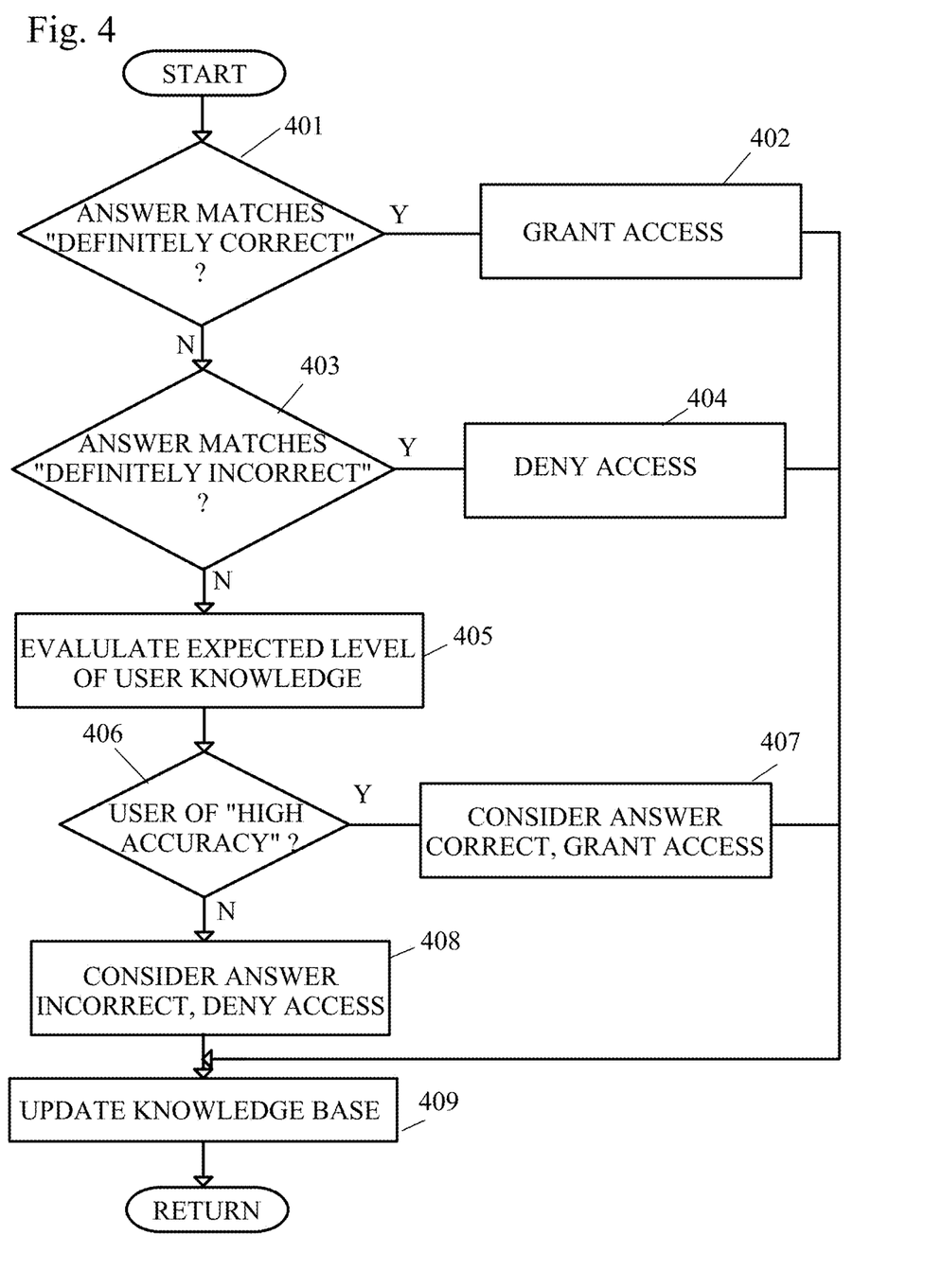
FIG. 4 shows a detailed flowchart of the step of evaluating an answer.

Referring to FIG. 4, the answer selected by the user in step 209 is evaluated, for example by the steps of:

Step 401: If the answer provided by the user matches an answer which was rated as "definitely correct", then the user response is evaluated as correct, and (step 402) the user is granted access to the system.

Step 403: If the answer provided by the user matches an answer which was rated as "definitely incorrect", then the user response is evaluated as incorrect, and (step 404) access is denied.

Step 405: If the answer provided by the user matches an answer which was rated as "not sure" (the only other choice), then the expected level of the user's knowledge will be evaluated. This will be done based on the information associated with the user's ID which was retrieved from a repository in step 201 (FIG. 2).

For example, if the user information indicates that the user is a manager or other person who would be expected to have a high level of knowledge with respect to the question, then the user's answer to a question about organization policy might be considered likely to be of high accuracy. Similarly, if the question is based on scientific knowledge, a user with a PhD in the field might be expected to provide answers which are more likely to be correct than a user without education relevant to the field.

The user information may also include information about the accuracy of previous answers which the user provided to other questions at previous log-ins. If the user has previously answered most or all of the questions correctly, the user's answer might be considered more likely to be correct than an answer provided by a user who has answered incorrectly more often than not.

Step 406: If the user's answer has been evaluated as likely to be of high accuracy, then (step 407) the answer is considered to be correct, and access to the system is granted. Otherwise (step 408), the answer is considered to be incorrect and access to the system is denied.

Step 409: The knowledge base is updated with information regarding the answer provided by the user. This information might include the time of the answer, the knowledge level of the user, and possibly other information.

For example, suppose an answer to the question was evaluated in the knowledge base as "definitely correct", but a large number of users who are evaluated with "high accuracy" have chosen other answers (or a large number of users who are evaluated as "low accuracy" have chosen the answer). The answer might be re-evaluated as "not sure" based on this analysis.

Similarly, if a question was evaluated as "definitely incorrect", but has been chosen by a large number of "high accuracy" users, may also be re-evaluated as "not sure".

Answers which were evaluated as "not sure" may also be re-evaluated. For example, if a large number of "high accuracy" users have chosen an answer, it could be re-evaluated as "definitely correct". Similarly, if the answer is only chosen by "low accuracy" users, it could be re-evaluated as "definitely incorrect".

This same method could be applied based on the bulk number of user answers ("popularity")—if enough users think an answer is correct, the answer can be upgraded from "definitely incorrect" to "not sure", or from "not sure" to "definitely correct".

The thresholds for "large" numbers of users can be set dynamically or by an administrator.

For example, a question may be connected to multiple answers which are correct or incorrect. If a QA pair in the knowledge base is:
Question: "What kind of food does the place supply for lunch?"
Answer: "A. Bread B. Pasta C. Rice D. Hamburger E. Toys F. phone"
Answer A to D are all suitable answers for the question, E and F are not. When a user is presented this question, the user will select answers A to D and therefore answers A to D receive a higher ranking than answers E and F. After multiple showings of this question to multiple users, answers E and F will not appear in the answer list.

For a QA system with a specific domain, such as a hamburger fast food restaurant, the "definitely correct" answer will be D, since in this specific industry most users logging in would have selected answer D and therefore answer D will rank as the best answer.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of verification for controlling access of a user to a system comprising the steps of:
   a computer receiving login information from the user;
   the computer selecting a question from a knowledge base;
   the computer creating a plurality of answers to the question selected from the knowledge base;
   the computer presenting the question and the plurality of answers to the user;
   the computer accepting a selection of an answer from the user and storing the answer in the knowledge base for future use in selecting answers for other users;
   the computer analyzing the answer provided by the user comprising the steps of:
     determining if the answer provided by the user matches an answer which was rated as definitely correct, definitely incorrect, or neither definitely correct or definitely incorrect;
     granting or denying access to the system; and
     updating the knowledge base with information regarding the answer provided by the user;
     wherein if the answer provided by the user matches an answer which was rated as definitely correct, evaluating the answer as correct, and granting access to the system;
     wherein if the answer provided by the user matches an answer which was rated as definitely incorrect, evaluating the answer as incorrect; and denying access to the system;
     wherein if the answer does not match an answer which was rated as definitely correct or definitely incorrect, evaluating a state of the user's knowledge to determine whether the user has a state of high accuracy; wherein if the user has a state of high accuracy, evaluating the answer as correct and granting access to the system; and wherein if the user has a state of low accuracy, evaluating the answer as incorrect and denying access to the system; and
   the computer controlling access to the system based on the analysis of the answer from the user to the question.

2. The method of claim 1, wherein the plurality of answers includes at least one correct answer and a plurality of answers which are incorrect or less correct.

3. The method of claim 1, wherein the question and the plurality of answers to the user are presented via a presentation selected from the group consisting of: obscured text in graphics files, text, and images.

4. The method of claim 1, wherein the step of the computer selecting a question further comprises the steps of the computer:
   selecting a set of questions;
   evaluating each question for features in the knowledge base to determine a score for each question; and
   selecting a question based on the score of each of the questions in the set.

5. The method of claim 4, wherein the features are selected from the group consisting of: popularity, time question was created in the knowledge base, and accuracy of the answer to the question.

6. The method of claim 1, wherein the login information is used to evaluate a state of the user's knowledge and associated user information.

7. A computer program product for verification for controlling access of a user to a system using a computer comprising at least one processor, one or more memories, one or more computer readable storage media, the computer program product comprising a computer readable storage medium having program instructions embodied therewith, the program instructions executable by the computer to perform a method comprising:
   receiving, by the computer, login information from the user;
   selecting, by the computer, a question from a knowledge base;
   creating, by the computer, a plurality of answers to the question selected from the knowledge base;
   presenting, by the computer, the question and the plurality of answers to the user;
   accepting, by the computer, a selection of an answer from the user and storing the answer in the knowledge base for future use in selecting answers for other users;
   analyzing, by the computer, the answer provided by the user comprising the program instructions of:
     determining, by the computer, if the answer provided by the user matches an answer which was rated as definitely correct, definitely incorrect, or neither definitely correct or definitely incorrect;
     granting or denying, by the computer, access to the system; and
     updating, by the computer, the knowledge base with information regarding the answer provided by the user;
     wherein if the answer provided by the user matches an answer which was rated as definitely correct, evaluating, by the computer, the answer as correct, and granting access to the system;
     wherein if the answer provided by the user matches an answer which was rated as definitely incorrect, evaluating, by the computer, the answer as incorrect; and denying access to the system;
     wherein if the answer does not match an answer which was rated as definitely correct or definitely incorrect, evaluating, by the computer, a state of the user's knowledge to determine whether the user has a state of high accuracy; wherein if the user has a state of high accuracy, evaluating, by the computer, the answer as correct and granting access to the system; and wherein if the user has a state of low accuracy, evaluating, by the computer, the answer as incorrect and denying access to the system; and
   controlling, by the computer, access to the system based on the analysis of the answer from the user to the question.

8. The computer program product of claim 7, wherein the plurality of answers includes at least one correct answer and a plurality of answers which are incorrect or less correct.

9. The computer program product of claim 7, wherein the question and the plurality of answers to the user are presented via a presentation selected from the group consisting of: obscured text in graphics files, text, and images.

10. The computer program product of claim 7, wherein the program instructions of selecting, by the computer, a question further comprises the program instructions of:
    selecting, by the computer, a set of questions;
    evaluating, by the computer, each question for features in the knowledge base to determine a score for each question; and
    selecting, by the computer, a question based on the score of each of the questions in the set.

11. The computer program product of claim 10, wherein the features are selected from the group consisting of: popularity, time question was created in the knowledge base, and accuracy of the answer to the question.

12. The computer program product of claim 7, wherein the login information is used to evaluate a state of the user's knowledge and associated user information.

13. A computer system for verification for controlling access of a user to a system comprising a computer comprising at least one processor, one or more memories, one or more computer readable storage media having program instructions executable by the computer to perform the program instructions comprising:

receiving, by the computer, login information from the user;

selecting, by the computer, a question from a knowledge base;

creating, by the computer, a plurality of answers to the question selected from the knowledge base;

presenting, by the computer, the question and the plurality of answers to the user;

accepting, by the computer, a selection of an answer from the user and storing the answer in the knowledge base for future use in selecting answers for other users;

analyzing, by the computer, the answer provided by the user comprising the program instructions of:

determining, by the computer, if the answer provided by the user matches an answer which was rated as definitely correct, definitely incorrect, or neither definitely correct or definitely incorrect;

granting or denying, by the computer, access to the system; and updating, by the computer, the knowledge base with information regarding the answer provided by the user;

wherein if the answer provided by the user matches an answer which was rated as definitely correct, evaluating, by the computer, the answer as correct, and granting access to the system;

wherein if the answer provided by the user matches an answer which was rated as definitely incorrect, evaluating, by the computer, the answer as incorrect; and denying access to the system;

wherein if the answer does not match an answer which was rated as definitely correct or definitely incorrect, evaluating, by the computer, a state of the user's knowledge to determine whether the user has a state of high accuracy; wherein if the user has a state of high accuracy, evaluating, by the computer, the answer as correct and granting access to the system; and wherein if the user has a state of low accuracy, evaluating, by the computer, the answer as incorrect and denying access to the system; and controlling, by the computer, access to the system based on the analysis of the answer from the user to the question.

14. The computer system of claim 13, wherein the plurality of answers includes at least one correct answer and a plurality of answers which are incorrect or less correct.

15. The computer system of claim 13, wherein the question and the plurality of answers to the user are presented via a presentation selected from the group consisting of:

obscured text in graphics files, text, and images.

16. The computer system of claim 13, wherein the program instructions of selecting, by the computer, a question further comprises the program instructions of:

selecting, by the computer, a set of questions;

evaluating, by the computer, each question for features in the knowledge base to determine a score for each question; and selecting, by the computer, a question based on the score of each of the questions in the set.

17. The computer program product of claim 13, wherein the login information is used to evaluate a state of the user's knowledge and associated user information.

\* \* \* \* \*